US006672807B1

(12) United States Patent
McIntyre et al.

(10) Patent No.: US 6,672,807 B1
(45) Date of Patent: Jan. 6, 2004

(54) PNEUMATIC TRANSFER TERMINAL AND METHOD OF OPERATION

(75) Inventors: Daniel S. McIntyre, Uniontown, OH (US); Rodney J. Reese, New Philadelphia, OH (US)

(73) Assignee: Diebold, Incorporated, North Canton, OH (US)

( * ) Notice: Subject to any disclaimer, the term of this patent is extended or adjusted under 35 U.S.C. 154(b) by 0 days.

(21) Appl. No.: 10/463,295

(22) Filed: Jun. 16, 2003

Related U.S. Application Data

(60) Provisional application No. 60/389,643, filed on Jun. 17, 2002.

(51) Int. Cl.$^7$ .............................................. B65G 51/30
(52) U.S. Cl. ....................................... 406/180; 406/190
(58) Field of Search ................................ 406/184, 185, 406/186, 187, 188, 189, 190

(56) References Cited

U.S. PATENT DOCUMENTS

| | | | | |
|---|---|---|---|---|
| 4,470,730 A | * | 9/1984 | Wuthrich ..................... 406/186 |
| 4,948,303 A | * | 8/1990 | Good ........................... 406/186 |
| 5,805,454 A | * | 9/1998 | Valerino et al. ............. 700/215 |
| 5,901,966 A | * | 5/1999 | Valerino et al. ............. 277/548 |
| 6,015,246 A | * | 1/2000 | Yamane et al. .............. 406/184 |
| 6,146,057 A | * | 11/2000 | Gromley et al. .............. 406/10 |

* cited by examiner

*Primary Examiner*—Joseph A. Dillon
(74) *Attorney, Agent, or Firm*—Ralph E. Jocke; Walker & Jocke (57) ABSTRACT

A system (10) for carrying out transactions between a customer at a customer station (14) and a service provider at a service provider station (12), includes transferring a body (96, 140, 170) through a pneumatic transfer tube (26). The customer at the customer station provides inputs corresponding to a financial account through input devices on the body such as a card reader (72, 146, 172) and a keypad (74, 148, 172). Data input by the customer is stored in the memory (82, 158) on the body. After transfer to the service provider station, data in the memory is output to a charge device (56) which is operative to assess a charge to the customer's account responsive to data output from the memory.

34 Claims, 9 Drawing Sheets

PNEUMATIC TRANSFER TERMINAL AND METHOD OF OPERATION

CROSS REFERENCE TO RELATED APPLICATION

This application claims the benefit of U.S. Provisional Application No. 60/389,643, filed Jun. 17, 2002.

TECHNICAL FIELD

This invention relates to transaction systems. Specifically, this invention relates to a system in which transactions are carried out between a service provider and remotely located customers through a pneumatic transfer apparatus, and in which system the customers may charge amounts associated with their transactions to their accounts without having to give to the service provider their credit card, debit card or other item corresponding to their account.

BACKGROUND ART

Pneumatic transfer systems which may be used to carry out transactions are known in prior art. Such systems may be used to conduct transactions between a service provider and remotely located customers. Such systems have been used in drive-through banking applications as well as in other transaction environments. Such systems are shown in U.S. Pat. Nos. 5,299,891 and 6,146,057, which are owned by the assignee of the present invention and the disclosures of which are incorporated herein by reference.

In many types of transaction systems customers prefer to make payment for their transactions using their credit card, debit card, smart card, or other item, which includes their account information and/or data corresponding to value. Unfortunately, in many such systems in order to make payment, the customer must surrender their card or other item to the service provider. Customers may be reluctant to surrender their card and/or to transfer it to the remote service provider. This is because the customer may be concerned that the service provider may use the card to make unauthorized charges to the customer's account or may copy information from the card for unscrupulous purposes. Some customers may also be reluctant to surrender their card as they perceive some risk that a malfunction of the pneumatic transfer system may result in their card being trapped or destroyed during transport through the system.

Another potential limitation of certain prior systems is that the customer may wish to use a debit card, smart card, or other item, which requires the use of a personal identification number (PIN) in order to process a transaction. Because the transaction terminal through which the PIN must be input is generally located adjacent to the service provider, a customer wishing to use their debit card may have to risk disclosing their PIN to the service provider so that the necessary charges can be made to the customer's account. The disclosure of the PIN by the customer lessens security and presents additional risks of fraudulent charges to the customer's account.

Thus, there exists a need for a transaction system which provides the benefits and convenience of enabling a customer to conduct transactions with a remote service provider, but which avoids the need for the customer to surrender their card or disclose their PIN to carry out the transaction.

DISCLOSURE OF INVENTION

It is an object of an exemplary embodiment of the present invention to provide an apparatus through which a customer may conduct a transaction with a remote service provider.

It is a further object of an exemplary embodiment of the present invention to provide a transaction system through which a customer may conduct a transaction with a remote service provider without requiring the customer to surrender their card or other item including account data or data representative of value.

It is a further object of an exemplary embodiment of the present invention to provide a transaction system through which a customer may use a debit card or other item requiring a PIN to conduct a transaction without having to disclose the PIN to a service provider.

It is a further object of an exemplary embodiment of the present invention to provide a transaction system in which advantages can be achieved without having to make extensive modifications to existing system components.

It is a further object of an exemplary embodiment of the present invention to provide a device which can receive card and/or other data at a customer station and deliver that received data at a remote service provider station so that a customer's account may be appropriately charged.

It is a further object of an exemplary embodiment of the present invention to provide a device which transfers account and/or PIN information between a customer station and a service provider station with a minimal risk that the information will be compromised.

It is a further object of an exemplary embodiment of the present invention to provide a method of operation of a transaction system.

It is a further object of an exemplary embodiment of the present invention to provide a method of operation of a transaction system in which a customer may retain possession of their debit card, credit card, or other item corresponding to their account or stored value while conducting a transaction with a remote service provider.

Further objects of exemplary embodiments of the present invention will be made apparent in the following Best Mode For Carrying Out Invention and the appended claims.

The foregoing objects are accomplished in an exemplary embodiment of the present invention by a system in which a pneumatic transfer apparatus transfers a carrier through a pneumatic tube by air pressure between a customer station and a service provider station. The exemplary system includes a carrier which may incorporate or have engaged therewith a body. The exemplary body includes a card reader and a keypad. The exemplary body further includes a processor and a memory in operative connection with a card reader and keypad. The exemplary body further includes at least one output device.

In an exemplary embodiment the customer at the customer station requests to purchase items, such as pharmacy items, from the service provider. This may include, for example, prescription medications that are to be delivered from a pharmacy. The service provider determines a total amount due from the customer. The body is then delivered to the customer station. The customer then passes his card through the card reader on the body and, if appropriate, inputs a PIN through a keypad on the body. The card and PIN data input by the customer is then stored in the memory of the body.

The body is then transferred through the pneumatic tube to the service provider station. In response to an input at the service provider station, the body outputs through the output device signals corresponding to the input customer data. The signals are then used to process a charge against a customer's account. If the customer's account is successfully charged, the items may be delivered to the customer through the pneumatic tube system.

In some embodiments, the body which is used to transfer the customer account data may be integral with the carrier that is transported between the service provider station and the customer station through a pneumatic tube. In alternative embodiments, the body used to transfer such data may be removably positionable in an interior area of a carrier which is moved between a service provider station and a customer station. In some further exemplary embodiments, the body may also be movable between customers and the service provider through other means, such as through a movable drawer or other mechanism that enables the body to be moved between the customer and the service provider.

BEST MODE FOR CARRYING OUT INVENTION

Figure 1:
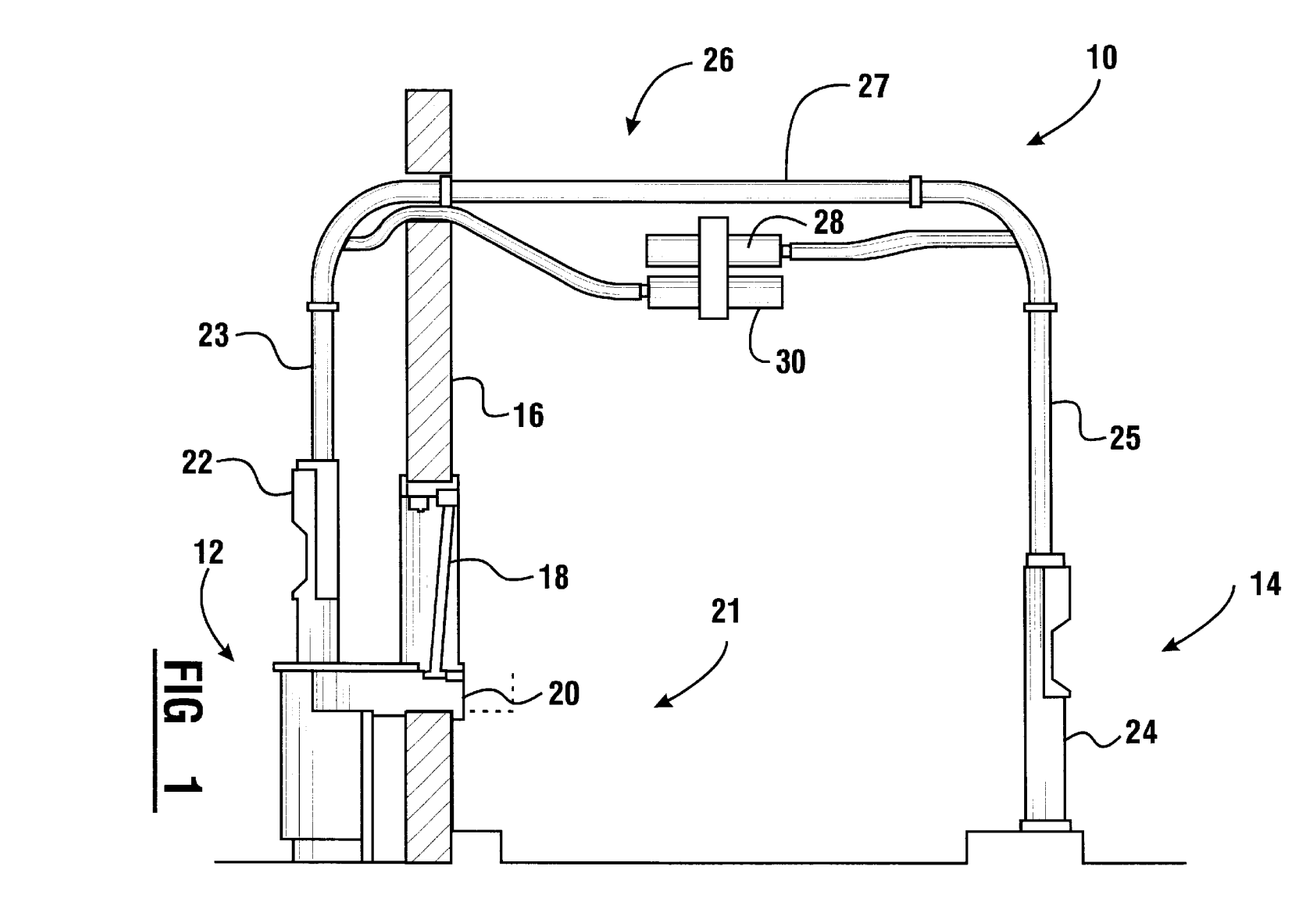
FIG. 1 is a schematic view of a transaction system including a pneumatic transfer apparatus used for carrying out transactions in accordance with an exemplary embodiment of the present invention.

Referring now to the drawings and particularly to FIG. 1, there is shown therein an exemplary embodiment of the transaction system incorporating an exemplary form of the present invention, generally indicated 10. The transaction system 10 includes a service provider station, generally indicated 12, and a customer station, generally indicated 14. In an exemplary embodiment, the service provider station is positioned within a facility in which goods or services are sold. In one exemplary embodiment, the service provider station is positioned adjacent to a pharmacy operation which enables pharmacy items, such as medications, to be delivered to customers adjacent to the customer station 14. In the exemplary embodiment, customer station 14 is positioned adjacent to a drive-through lane in which customers may carry out transactions while positioned in a vehicle.

In the exemplary embodiment, the service provider station is also positioned adjacent to a drive-through window 18. A movable drawer mechanism 20 may be used by the service provider at the service provider station to exchange items with customers at a customer station 21 which is a drive-through lane adjacent to the drawer mechanism 20.

The exemplary service provider station includes a service provider terminal 22. The exemplary customer station includes a customer terminal 24. Terminals 22 and 24 are connected by a pneumatic tube transfer conduit 26. The pneumatic tube transfer conduit includes a first generally vertically extending leg portion 23 which is adjacent to and in communication with the service provider terminal 22. The second generally vertically extending leg portion 25 is adjacent to and in communication with the customer terminal 24. A transversely extending portion 27 extends generally horizontally between the first and second leg portions. The transverse portion 27 is connected to the vertically extending leg portions through radiused bends in the conduit which are radiused to enable the passage of a pneumatic carrier therethrough between the service provider terminal and the customer terminal.

A first blower 28 is connected to transfer conduit 26 generally in the area above the customer terminal 24. Blower 28 may be selectively operated to draw negative pressure in the transfer conduit in the area generally above the customer terminal. Blower 28 further includes suitable valving so that when the blower 28 is not operated, air is generally prevented from entering the transfer conduit 26 through the blower 28. A blower 30 similar to blower 28 is connected to the transfer conduit in the area generally above service provider terminal 22. Blower 30 may be operated to selectively produce negative pressure in the transcript conduit above the service provider terminal. Like blower 28, when blower 30 is not operating, air is generally prevented from entering the transfer conduit through the blower.

Figure 5:
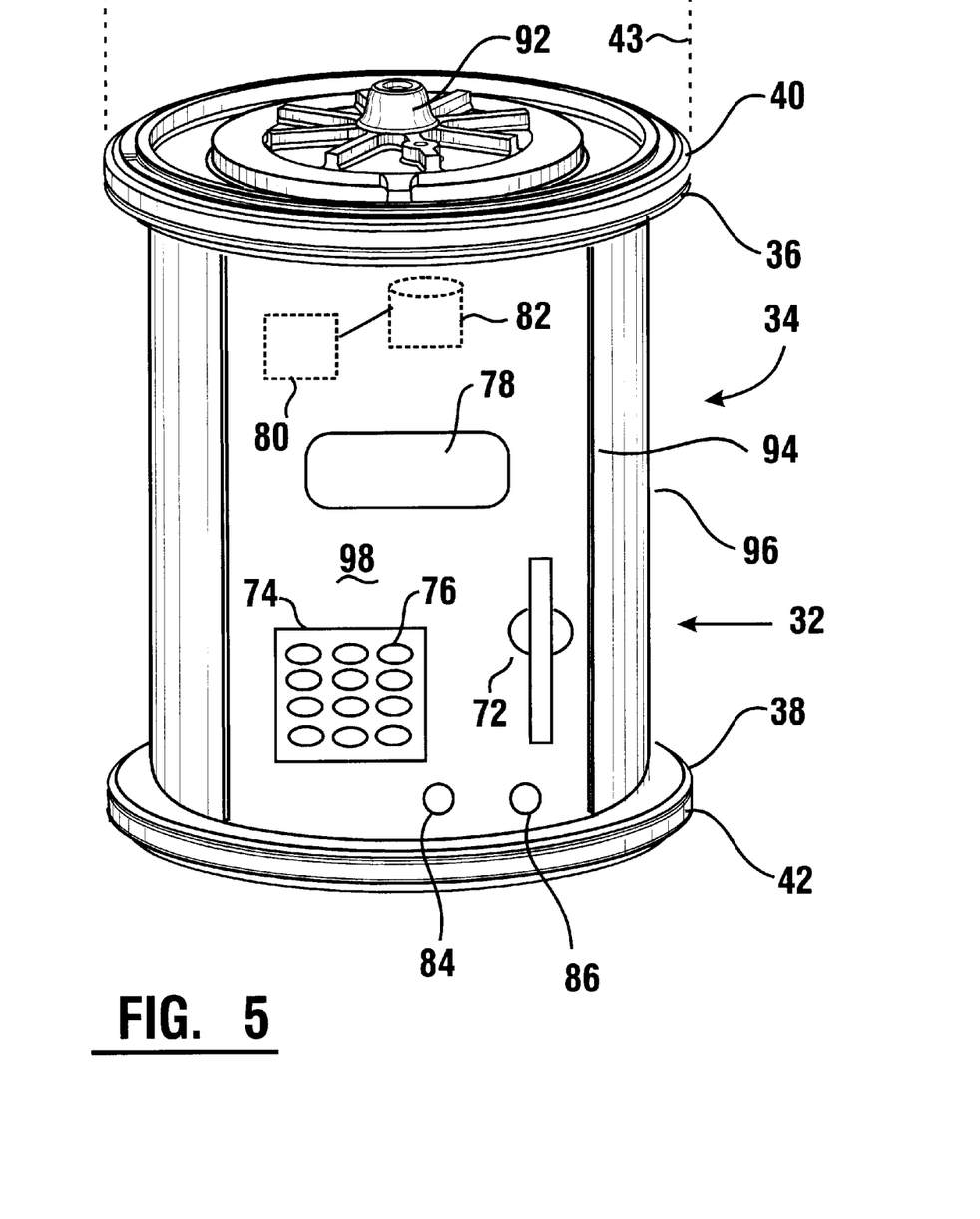
FIG. 5 is an isometric view of an exemplary carrier which may be used in connection with the system shown in FIG. 1.

In an exemplary embodiment of the invention, a carrier 32 of the type shown in FIG. 5, is enabled to be selectively moved between the service provider terminal and the customer terminal by the application of differential pressure produced in the tube by blowers 28 and 30. As shown in FIG. 5, the exemplary carrier 32 includes a housing 34. The housing includes a first end member 36 and a second end member 38. The first end member 36 includes an annular resilient seal ring 30 supported thereon. Likewise, second end member 38 has an annular resilient seal ring 42 supported thereon. The seal rings provide slidable and generally fluid tight engagement between the carrier housing and an interior wall of the pneumatic tube as schematically indicated 43 in FIG. 5. The angular seal rings enable the carrier to be moved in the tube through the application of a pressure differential on opposite sides of the carrier.

Figure 2:
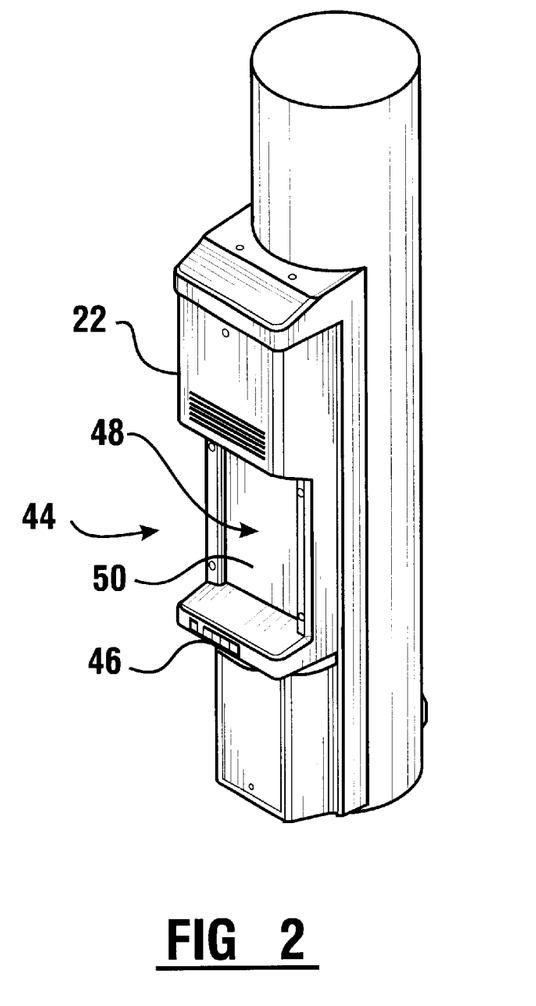
FIG. 2 is an isometric view of a portion of the service provider station as shown in FIG. 1.
Figure 3:
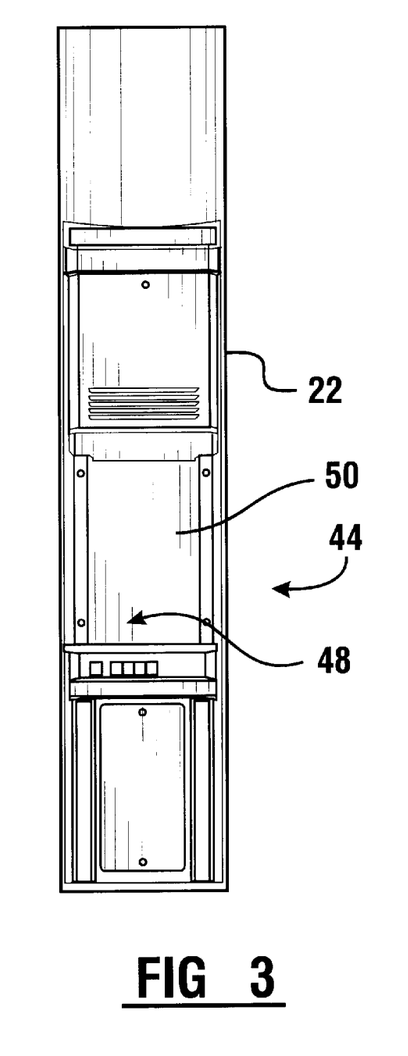
FIG. 3 is a front plan view of the portion of the service provider station shown in FIG. 2.

FIGS. 2 and 3 show the exemplary service provider terminal 22 in greater detail. The exterior of the service provider terminal includes an interface generally indicated 44 which includes a control panel 46. Control panel 46 includes buttons and indicators which are used by a service provider to cause the carrier to move between the service provider station and the customer station, as well as to input other commands. In an exemplary embodiment, the control panel 46 includes a button which may be actuated to apply differential pressure to transfer the carrier from the service provider station to the customer station. Another button included on the control panel may be actuated to apply differential pressure to move the carrier from the customer station to the service provider station.

In an exemplary embodiment, the customer and service provider stations include an audio interface which includes a microphone and speaker at each of the service provider and customer stations. This enables a service provider to audibly communicate with the customers. Buttons or similar devices on the control panel 46 may be selectively actuated by the service provider to enable the service provider to speak to and/or listen to a customer at the customer station.

The exemplary control panel 46 of the service provider station may further include indicator lights or other devices for providing the service provider with information concerning the status of components in the system. Alternative embodiments of the system may include additional devices for communicating with customers. These may include, for example, video communication devices or other devices for facilitating communication between the customer and the service provider.

The exemplary service provider terminal 22 further includes a transfer opening 48. The transfer opening extends through the transfer conduit and enables access to the carrier 32. In the exemplary embodiment, the service provider is enabled to place items to be transferred to a customer into an interior area of the carrier when the carrier is positioned at the service provider station. In an exemplary embodiment, the items to be transferred include pharmacy items, such as medical items, instruction booklets, currency, credit card vouchers, receipts, prescriptions and other documents and things that are exchanged in performing a transaction.

In the exemplary embodiment, the transfer opening 48 includes a door 50. Door 50 is preferably a sliding type door that is movable up and down so as to selectively cover or enable access to the carrier through transfer opening 48. The door 50 is selectively moved between its respective positions by a door moving mechanism (not shown). The door moving mechanism controls the opening and closing of the door 50 at appropriate times and responsive to the control circuitry of the system. The exemplary service provider station as well as the customer station may further include features of the incorporated disclosure of U.S. Pat. No. 6,146,057. Similarly, the customer station 14 includes appropriate mechanisms to enable a customer positioned at the customer station adjacent to the customer terminal 24 to access the carrier 32 when the carrier is positioned thereto.

Figure 4:
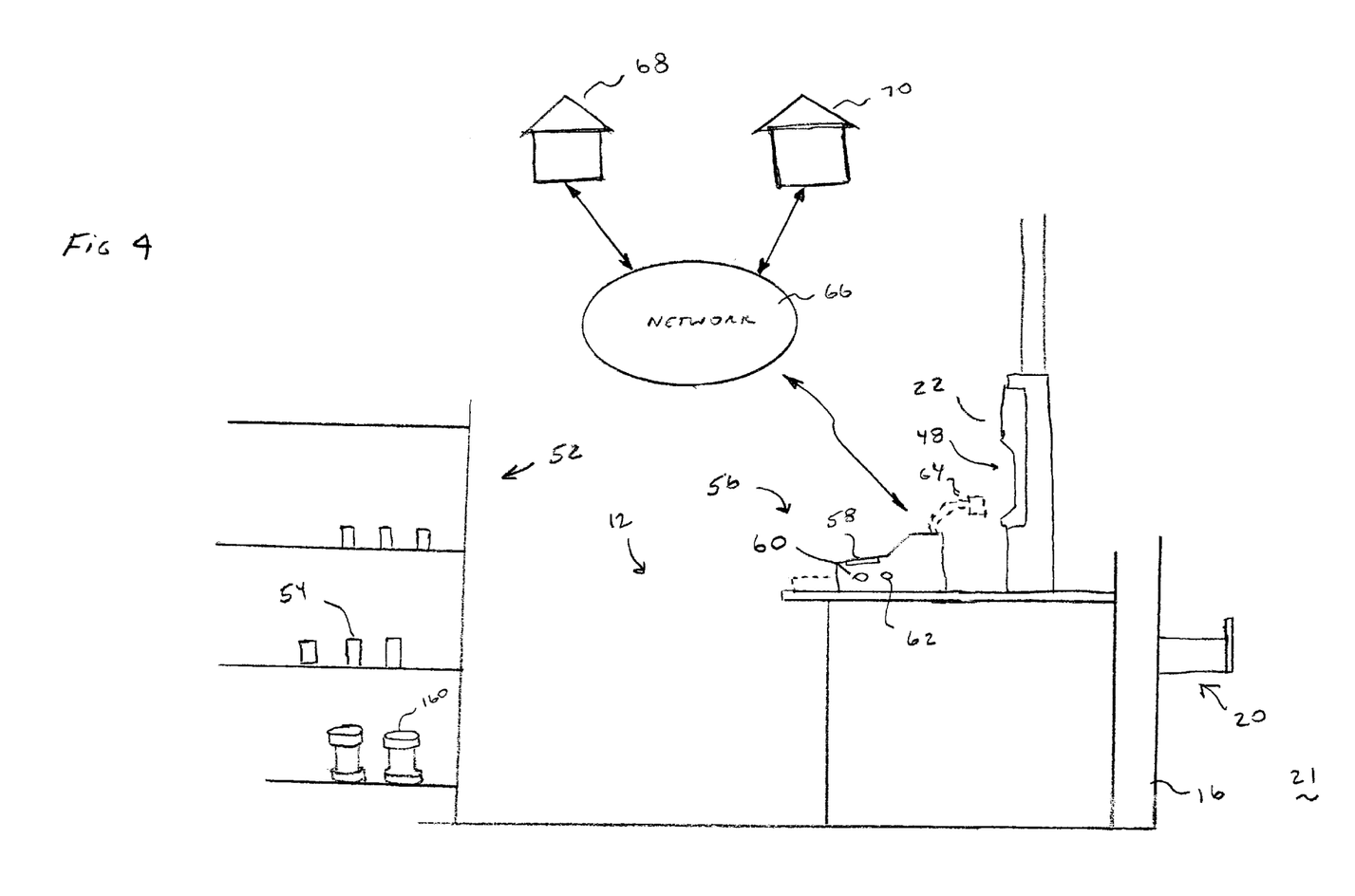
FIG. 4 is a schematic view of the service provider station and the transaction networks connected thereto for purposes of assessing charges against customers' accounts.

FIG. 4 shows an exemplary service provider station which is positioned adjacent to a pharmacy which is schematically indicated 52. Pharmacy 52 includes items schematically indicated 54 which are purchased by customers and delivered to customers at the customer stations through the pneumatic tube or the movable drawer mechanism.

An exemplary service provider station further includes a charge device 56. In exemplary embodiments the charge device may include a cash register, POS terminal or other device that can be used to cause a charge to be assessed to a customer's account. In the exemplary embodiment, the charge device 56 includes an amount input device 58. The amount input device 58 includes input devices, for example numerical keys or other types of input devices, that can be used to receive inputs and/or instructions related to amounts to be charged to a user's account.

The exemplary charge device 56 further includes in operative connection therewith, a reading device 60. The reading device 60 may be used in a manner later described to receive signals output from an output device on the carrier or other body. The exemplary charge device further includes a further output device 62. Output device 62 in the exemplary embodiment, may be used to provide an output in the manner later discussed so as to indicate the status of certain transaction steps which may cause actions to be taken, for example to erase information stored in memory on the carrier or other body. As indicated in phantom in FIG. 4, an exemplary embodiment of the charge device may include a selectively positionable input/output device 64. The input/output device 64 may include the functions of the reading device 60 and 62. In exemplary embodiments where the carrier 32 is held captive within the pneumatic transfer tube conduit, the input/output device 64 may be selectively positioned adjacent to the transfer opening 48 so as to achieve communication with the processor and memory supported on the carrier.

As shown in FIG. 4 the charge device 56 may also be in operative connection with remote computers that can assess charges to customers' accounts. Such communication may be achieved through a network schematically indicated 66. Network 66 may be comprised of a single network or multiple connected networks. Network 66 enables communication with entities that can assess a charge to a debit account such as an account of a customer at a bank schematically indicated 68. Alternatively or in addition, network 66 may enable communication with a credit charge processing entity 70, such as an entity associated with VISA® or MasterCard®. Of course this arrangement for assessing charges against customers' accounts is exemplary and in other embodiments other approaches and system configurations may be used.

As shown in FIG. 5, the exemplary carrier 32 includes a body 96. Body 96 bounds an interior area of the carrier which is adapted for holding items that are transferred between customers and the service provider. In the exemplary embodiment, body 96 has an opening 94. Opening 94 provides access to the interior area of the carrier. A movable cover 98 is selectively positionable so as to block access to the interior area through the opening or to enable access thereto. Movable cover 98 is movable through rotation of an end cap 92 in the manner described in the incorporated disclosure.

In the exemplary embodiment carrier 32 serves as a data transfer unit for transferring account and/or user identifying information between a customer and a service provider. In the exemplary embodiment the carrier enables card, PIN and/or other data to be provided by the customer at the customer station, and then to have such data delivered to the charge device at the service provider station.

The exemplary carrier 32 includes a card reader 72 in supporting connection with the movable cover. In the exemplary embodiment the card reader 72 is adapted to receive a magnetic stripe card therein. The card reader receives a card of a customer into a slot and is operative to read magnetic stripe data from the card as the card is either inserted and/or withdrawn from the card reader slot.

Carrier 32 further includes in supporting connection with the movable cover 98, a recessed keypad 74. Keypad 74 includes a plurality of keys 76. In the exemplary embodiment keys 76 are alphanumeric keys which facilitate the input of a PIN or other data or instructions by the customer.

In the exemplary embodiment the movable cover 98 further includes an output device 78 which comprises a display. Display 78 in the exemplary embodiment includes an LCD type display which is enabled to output alphanumeric data to a user. It should be understood however that the input and output devices shown on the carrier 32 are exemplary and in other embodiments other or additional types of input and/or output devices may be used.

Carrier 32 further has in supporting connection therewith a processor schematically indicated 80. Processor 80 includes the capability to process instructions so as to carry out the functions later described. Processor 80 is in operative connection with a memory schematically indicated 82. Memory 82 is operative to hold instructions to be executed by the processor as well as other data as hereafter described.

Carrier 32 of the exemplary embodiment further includes an output device 84. In the exemplary embodiment output device 84 provides outputs in the form of signals. In the exemplary embodiment the signals are infrared signals. It should be understood however that in other embodiments other types of output devices may be used, including other types of radiation emitting devices including devices such as LFDs or RF output devices. Other output devices used in embodiments may include (but are not limited to) electrical connectors, displays, RF backscatter devices, sonic output devices or other types of devices which are operative to output or otherwise provide signals.

In the exemplary embodiment, carrier 32 further includes a reading device 86. Reading device 86 is operative to receive signals from the output device 62 of the charge device in the manner earlier explained. The output device 84 and the reading device 86 are also in operative connection with the processor 80 and the memory 82.

It should be understood that although in the embodiment shown in FIG. 5 the carrier body is integrally formed with the transaction data transfer terminal, in other embodiments other types of data transfer devices may be used. For example a body may be provided which is separable from the carrier so as to enable the body to be removed from the pneumatic transfer apparatus. In further alternative embodiments a carrier may be removable from the pneumatic transfer conduit such that the carrier may be used for data transfer, and a different carrier placed in the conduit and used to transport items between the service provider and the customer. Of course numerous alternative approaches may be used which are encompassed within the scope of the present invention.

Figure 8:
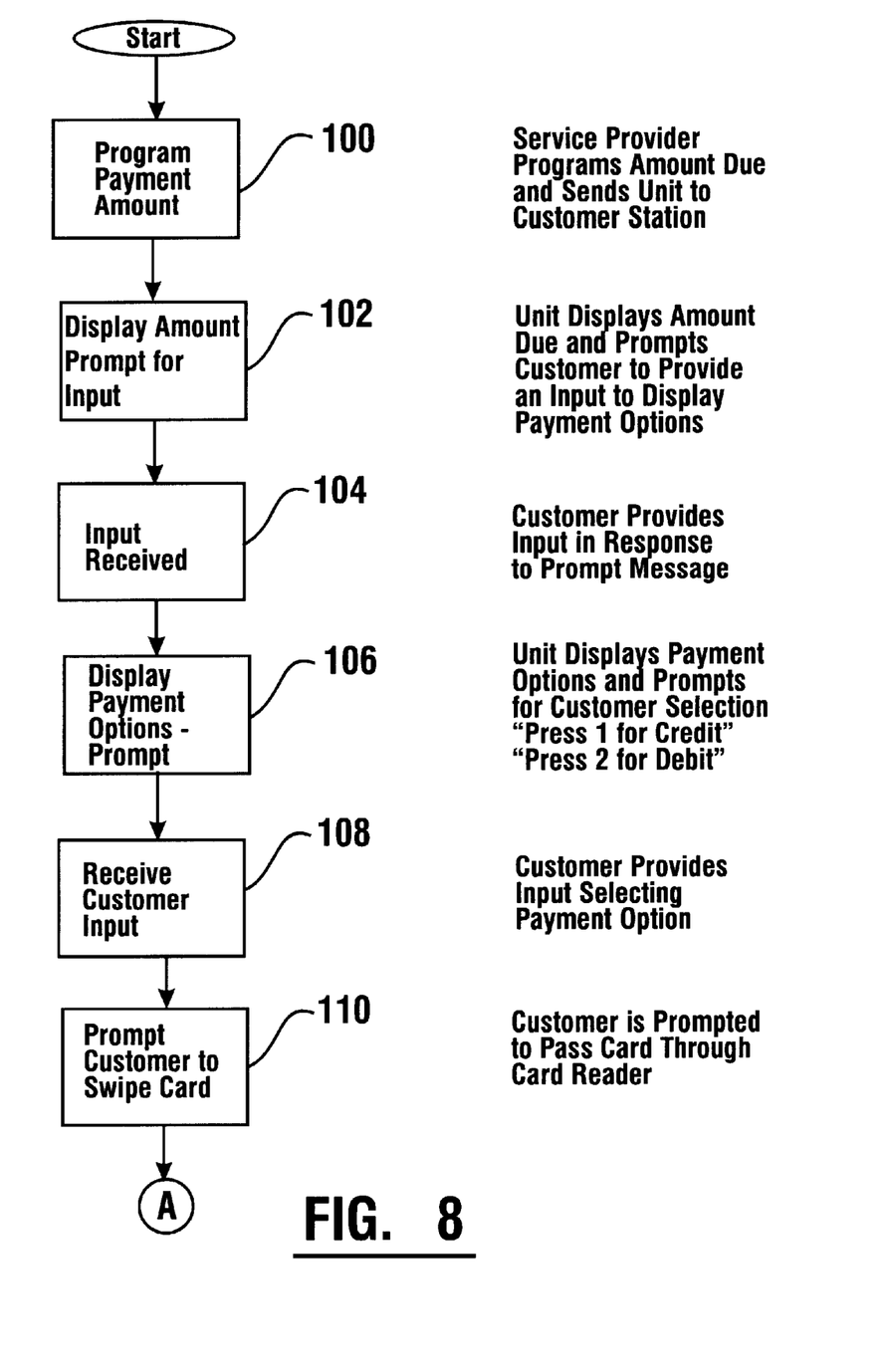
FIGS. 8 through 10 are schematic views of transaction steps which are conducted through operation of the transaction transfer unit of an exemplary embodiment.
Figure 9:
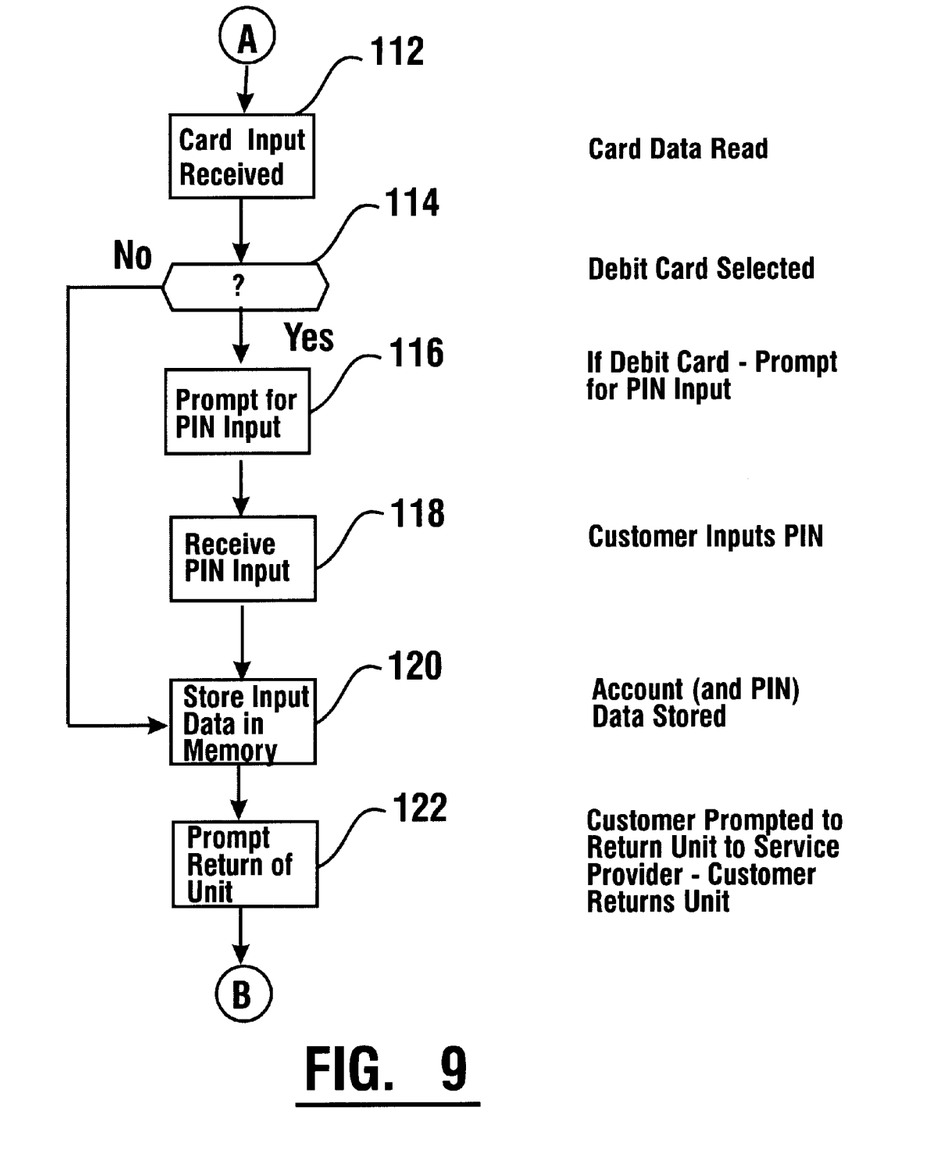

Operation of an exemplary system for purposes of carrying out a transaction between a service provider and a customer will now be explained with reference to FIGS. 8 through 10. In the exemplary embodiment the service provider receives requests from the customer at the customer station, such as a request to purchase items. In the exemplary embodiment these would be pharmacy items 54 which have an associated charge. The customer may provide documents, prescriptions or other information to the service provider. This may be done by transporting these items in the interior area of the carrier, by providing information through the communication system provided between the customer station and service provider station, or combinations thereof. The items requested by the customer will have an associated charge. This charge can be calculated either by the service provider or through use of the amount input device on the charge device or other input mechanisms.

In this exemplary embodiment if the customer indicates to the service provider that they wish to charge their debit or credit card account for the items to be delivered, the service provider operates the charge device 56 through appropriate inputs, to program the amount the customer is to pay into the carrier 32. This is reflected by a step 100 shown in FIG. 8. In the exemplary embodiment the programming of the amount information into the memory 82 of the carrier is accomplished by the transmission of signals from the output device 62 (or with the combined input and output device 64) which are received by the reading device 86. Once the amount to be paid is programmed into the memory of the carrier, the service provider provides appropriate inputs at the service provider's station to cause the carrier to be transmitted to the customer station.

At the customer station the processor 80 operates to cause the amount due from the customer to be output through the display 78. The processor also operates in response to programmed instructions in memory to output a prompt through the display for the customer to provide an input so as to display and eventually select their payment options. This is indicated by a step 102. The customer then provides the requested input in response to the prompt indicated by step 104. The input may be for example, the customer touching one or more keys 76 of the keypad.

In response to input received from the customer in step 104 the processor is operative to cause the display 78 to output payment options for the user. This is represented by a step 106. The output payment options may include for example prompting the customer to press 1 for a credit transaction and to press 2 for a debit transaction. The customer then provides a selected input as represented by step 108.

In response to the customer providing the payment option selection, the processor is operative to cause the display 78 to output a prompt requesting that the user swipe their card through the card reader 72. This is represented by step 110. The input by the user from their card through the card reader causes data to be read from the magnetic stripe of the card as represented by step 112 in FIG. 9. The processor then operates in accordance with its programmed instructions to determine if it was a debit or credit card transaction that the customer selected. This is represented in step 114. If the customer has requested a debit card transaction, the processor operates to provide an output prompting the customer to input their PIN as indicated in step 116. When the PIN data is received as reflected in step 118, the processor then operates to cause the card and PIN data to be stored in the memory on the carrier as reflected in step 120. Of course as schematically indicated in FIG. 9, if the customer has requested a credit card transaction which does not require PIN data, only the card data is stored.

Upon receiving the data from the customer necessary to assess a charge against the customer's selected account, the processor operates in accordance with its instructions to provide an output through a display 78 prompting the user to return the carrier to the service provider station. This is represented in FIG. 9 by a step 122. In response to a prompt, the customer in some embodiments may cause the carrier to be transferred to the service provider station through one or more inputs to input devices at the customer terminal. Alternatively the customer may notify the service provider that they are ready to send the carrier and the service provider may provide the inputs necessary to transfer the carrier to the service provider terminal. It should be further understood that in some embodiments the processor may operate in accordance with its programming to provide additional steps and functions such as to request that the customer retry the card reading steps and/or PIN entry steps in cases where the data has not been properly received or stored, or in cases where the customer indicates that they have made an error.

Figure 10:
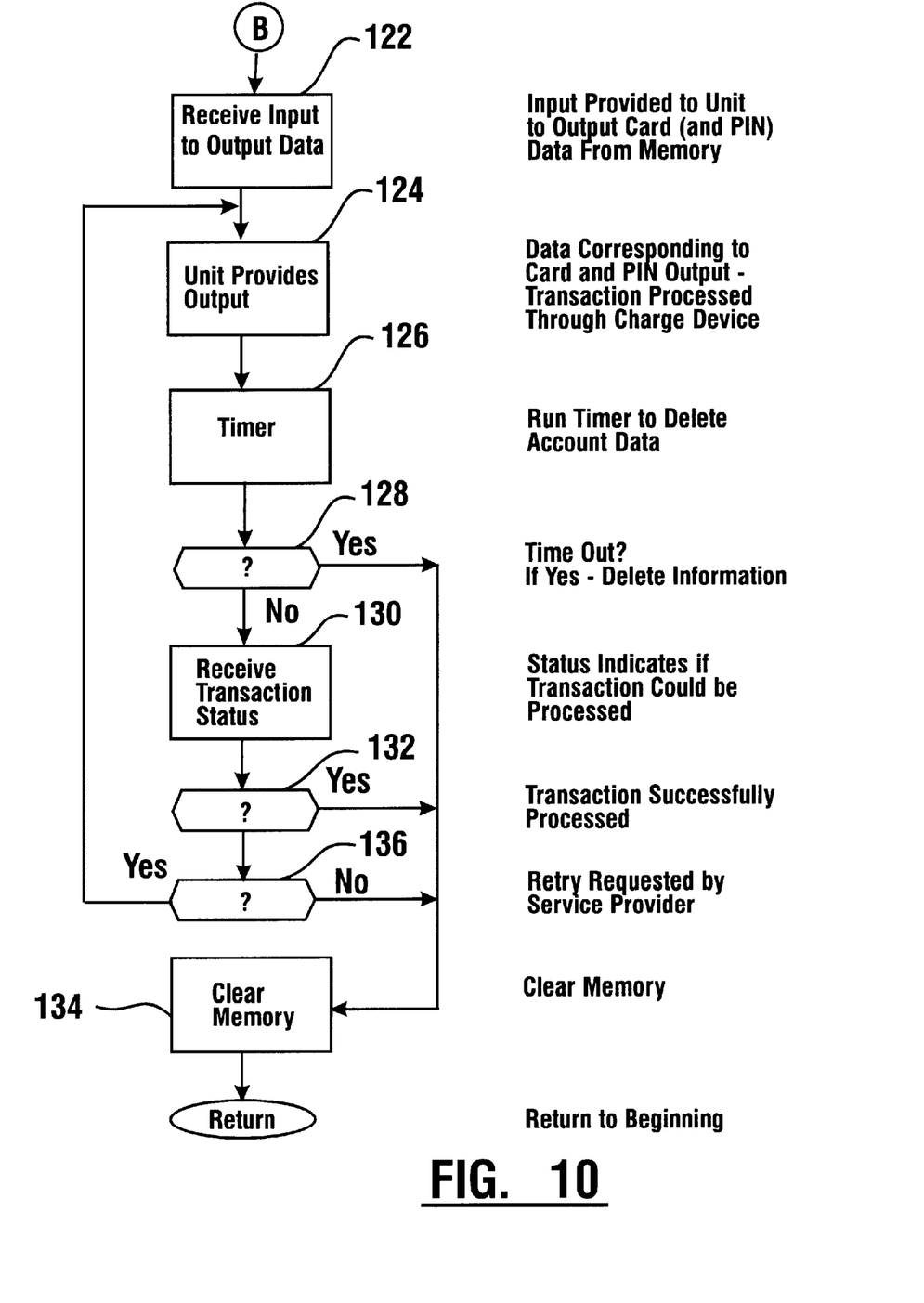

As represented in FIG. 10 with the carrier returned to the service provider station, the service provider through operation of the charge device 56 provides at least one input to the reading device 86 on the carrier. This is done by the transmission of signals to the output device 62 and/or through the combined input/output device 64. This input is operative to notify the processor on the carrier that the data stored in memory necessary to process the transaction, is to be output. This is represented by a step 124.

As indicated in step 126, the carrier then outputs through the output device 84, signals corresponding to the data stored in memory. This data includes card data and, if appropriate, PIN data. The data output through the output device 84 is received by the reading device 60 of the charge device and/or by the combined input/output device 64.

In response to receiving the data stored in memory of the carrier, the charge device is operative to cause a charge to be assessed against the user's account. In the exemplary embodiment the charge device is operative to send appropriate messages through the network 66 to the entity that can assess the charge against the user's selected account. The appropriate charge assessing entity through operation of its computer systems generally responds to the charge device with appropriate messages indicating that the charge is acceptable against the requested account. Of course if the charge is not authorized, then one or more messages indicative of this situation is sent through the network to the service provider. In the exemplary embodiment the service provider is notified whether or not the charge is acceptable through outputs provided through one or more output devices on the charge device 58. These may be outputs provided, for example, through a display on a point of sale terminal, electronic cash register, card authorization terminal or other apparatus integral with or connected to the devices used to communicate the messages to assess the charge against the user's account.

In the exemplary embodiment when the carrier outputs the data corresponding to the customer's account information, a timer is run and reflected in a step 126. This is done in the exemplary embodiment so that the data input by the customer is eventually automatically erased from the memory of the carrier unit. This reduces the risk that unauthorized access to this information will be obtained. If the preset time elapses without further action as indicated in a step 128, such data in the memory 82 on the carrier is erased.

In the exemplary embodiment an output is provided through the output device 62 of the charge device or through the combined input/output device 64, to indicate to the processor on the carrier whether the transaction could be successfully processed. This is indicated in a step 130. As indicated in step 132, if the transaction was successfully processed, the processor operates to clear the memory of the customer's data as indicated in step 134. Alternatively if the transaction could not be successfully processed, but the service provider chooses to resubmit the transaction, the service provider may through the charge device cause the carrier to output the transaction data again as reflected at a step 136. As FIG. 10 indicates however, the carrier will output the transaction data a second time only if the timing function has not caused the data in memory to be automatically erased. If the service provider chooses not to retry the requested transaction in step 136, the customer transaction data stored in memory on the carrier is erased. This readies the carrier to receive new charge account data from either the same or another customer.

If the charge is successfully assessed to the customer's account, the service provider in the exemplary embodiment will provide inputs to the service provider terminal so as to open the movable cover 98 on the carrier. The service provider will then place the items that have been purchased by the customer in the interior area of the carrier and provide inputs to close the movable cover. Further inputs provided by the service provider to the service provider terminal will operate the blower so as to cause the carrier to be transported to the customer station. Once at the customer station the cover will be opened such that the customer may access the items as well as receipts, instructions, promotional material or any other things which the service provider has placed in the interior area of the carrier for delivery to the customer.

After the items have been taken by the customer, the customer will generally leave the customer station and the service provider is ready to service another customer.

Figure 6:
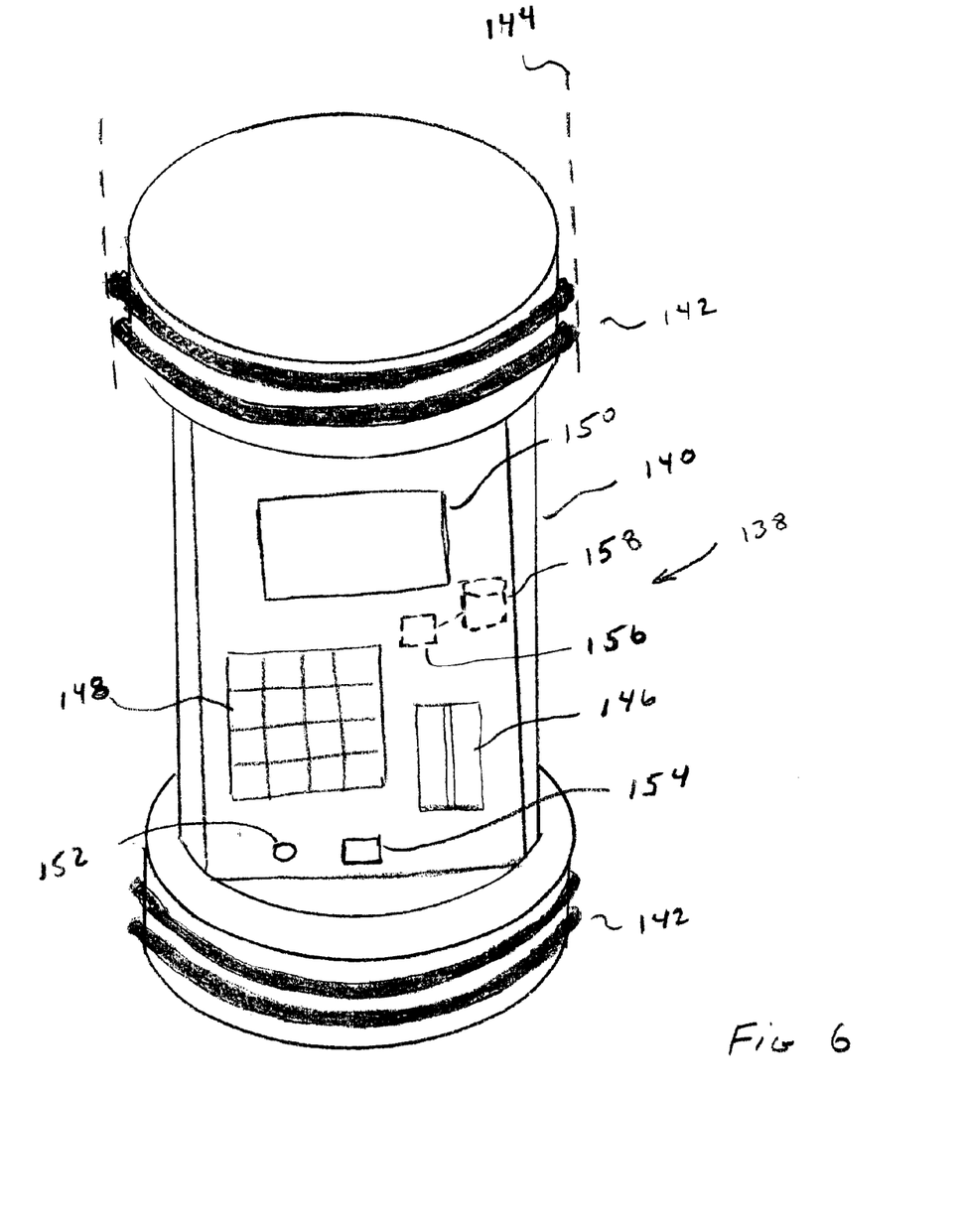
FIG. 6 is an isometric view of an alternative type carrier with an integral transaction data storage unit, which may be used in some embodiments of the invention.

Other alternative exemplary embodiments may include types of pneumatic transfer systems in which the carrier, which is transported between the service provider station and the customer station, may be removed from the transfer conduit. FIG. 6 shows an exemplary data transfer unit schematically indicated 138 which may be used in such an embodiment. Unit 138 includes a body 140. Body 140 includes annular seal rings 142 adjacent each end which enable slidable generally fluid tight engagement with the interior wall of a transfer tube which is schematically represented 144. Body 144 has in supporting connection therewith a card reader 146 and a keypad 148 including a plurality of keys. Body 140 also includes a display 150, an output device 152 and a reading device 154. Body 140 also has supported thereon a processor schematically indicated 156. The processor 156 is in operative connection with a memory schematically indicated 158.

The operation of the system which includes the unit 138 is generally similar to that previously described. The unit may be programmed with the amount due by the service provider at the service provider station through operation of the charge device. This can be accomplished for example, through the output device 62 delivering signals to the reading device 154 which indicates the charge amount. These may be for example, infrared signals or other types of radiation signals. Of course as previously discussed, other types of electrical or electronic signals including physical electrical connections may be used.

Once programmed with the amount data, the unit 138 may be placed in the transfer tube and transferred to the customer station. Because the customer is enabled to remove the unit from the transfer tube, the customer does not have to extend themselves through a window of their vehicle to swipe their card and/or provide a PIN input, or input other data to the unit. Rather, the customer may provide the necessary inputs within the confines of their vehicle in the drive-through lane adjacent to the customer station.

Once programmed with the information, the unit 138 may then be placed in the customer terminal by the customer and transported to the service provider terminal. At the service provider station, the service provider may remove the unit from the tube and receive the account information from the output device 152 so as to assess the charge to the customer's account in the manner previously discussed. The successful assessment of the charge may also cause the charge device to output signals which are received by the carrier so as to erase the customer information from the memory.

In this alternative embodiment, because the carrier is removable from the tube, the service provider may deliver items to the customer through use of an alternative carrier. Such an alternative carrier is schematically indicated 160 in FIG. 4. The carrier 160 may be similar in configuration to the unit 138 but may include an interior area in which items may be stored and transferred between the customer and the service provider. As a result, the exemplary systems including the unit 138 may employ carriers only intended for transferring items in transactions where it is not necessary to receive account data from the customer. In those transactions where it is necessary to receive debit or credit card data, the other carrier may be removed from the system by the service provider and the unit 138 used to transfer the necessary account data. Of course it should be understood that unit 138 and its method of use are exemplary and in other embodiments other approaches may be used.

Figure 7:
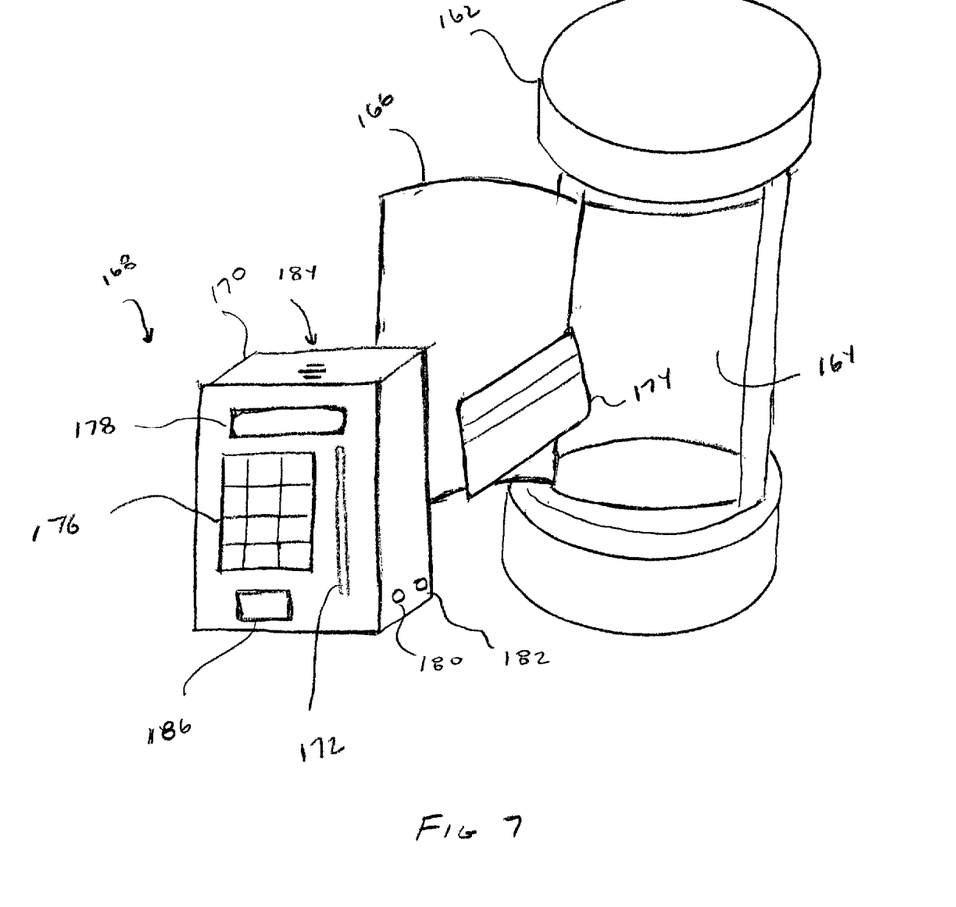
FIG. 7 is an isometric view of an alternative embodiment of a carrier and transaction data transfer unit that may be removably positioned in an interior area of a carrier or in an alternative device for transferring the unit between a customer and a service provider, such as a movable drawer.

FIG. 7 shows yet a further alternative embodiment of a data transfer unit which may be used to deliver account information from the customer to the service provider. FIG. 7 shows a carrier 162 of a type that is removable from the transfer conduit. Carrier 162 includes an interior area 164. Access to interior area 164 is controlled by removable cover 166.

A data transfer unit 168 is removably positionable in the interior area 164. In this embodiment the data transfer unit may be moved between the service provider and the customer in a manner similar to other items that are exchanged between the service provider and the customer. Unit 168 includes a body 170 sized to be removably positioned in the interior area 164. Body 170 includes in supporting connection therewith a card reader schematically indicated 172 for reading cards such as card 174 as shown. It should be understood that although card 174 shown is a magnetic stripe card, other embodiments may be capable of reading smart cards or other types of cards which include account information or data representative of monetary value.

Unit 168 further includes a keypad 176 including the plurality of keys and a display 178. Body 170 also has supported thereon an output device 180 and a reading device 182. It should be understood that body 170 further includes a processor and a memory and may be operated in a manner similar to that described in connection with other embodiments.

Alternative embodiments may also include other types of input and output devices in addition to or different from those previously described. For example unit 168 may include audio output devices such as a speaker schematically indicated 184. Such an output device may be useful in providing instructions for operation of the device by persons who are visually impaired. In addition or in the alternative, unit 168 may include a device and appropriate programmed instructions to receive and interpret verbal inputs from users. Alternatively or in addition, unit 168 may include a device for reading biometric indicia such as fingerprint reader 186. In some embodiments biometric indicia may be received for purposes of identifying a particular user and/or their account. Such information may be received and stored by the unit and transferred to the charge device or other device at the service provider station. Such information may be used to verify that the transaction is authorized or that the user is a person who is authorized to charge amounts against a particular account. Alternatively or in addition, biometric inputs may be compared to data stored on a card or in other local or remote memory for purposes of determining the identity of the particular user and their authority to conduct the transaction. This may be appropriate for example when a user is receiving medical items which are narcotics through the system. In such cases the biometric inputs may be used to further verify that the individual is authorized to receive the narcotics and/or may assist in tracking unauthorized transactions. Further in some embodiments inputs such as biometric inputs or other inputs may be compared to data stored on the user's card for purposes of verifying that the user's card is being used by the authorized user. This data may be stored for example on a memory chip on a card and the verification may be accomplished through the processor in the portable unit. Of course these approaches are merely exemplary.

In alternative embodiments the portable unit may include other types of input devices suitable for accepting inputs from the user. For example, the unit may include a reader for reading other types of identifying items indicating how amounts are to be charged. This may include, for example, readers for bar codes, RFID or other types of items or signals bearing identifying indicia. As a result the portable unit may be used for reading items such as benefit plan cards or hospital ID bands. Such items may be used to communicate information on how to assess charges, including charges to be assessed to third parties. The information may be transmitted to the charge device and utilized for purposes of assessing appropriate charges, tracking medication use, or other purposes.

The operation of the unit 168 shown in FIG. 7 in connection with the transaction system may be generally similar to that previously described. A further advantage of the unit 168 shown in FIG. 7 is that the unit may also be provided to customers other than by delivery through the pneumatic tube conduit. For example unit 168 may be passed to a customer through the opening in the wall 16 by extending and retracting the movable drawer 20. In this way a customer located at customer station 21 may use the unit 168 to provide card and/or PIN data for purposes of carrying out transactions with the service provider.

In alternative embodiments the carrier or other unit may also serve to perform other functions. For example, memory in the portable unit may be used to hold .wav files or other data that can be used to provide audio outputs. Such audio outputs may be used to provide the user with instructions for use of the items delivered. For example, audio instructions may be associated in a database in the establishment with an item being provided to the user. As a result when the item is indicated as being sold through the charge device, or in response to other inputs such as scanning a bar code on the item, a computer in the establishment operates to cause the data to produce the audio instructions to be loaded into the memory of the portable unit. Thereafter when the user is to receive the items, such as in a carrier, or at another time, the audio instructions may be output through a speaker on the carrier or other connected speaker. Alternatively such instructions may be provided by a pharmacist for the particular user or for the particular items. The pharmacists's instructions may be stored as data and transferred to the memory in the carrier or other unit from which they are output to the user. In some embodiments the processor may be programmed to enable a user after receipt of the instructions to repeat them by providing one or more inputs. Of course these approaches are exemplary and in other embodiments other approaches may be used.

In some alternative embodiments the portable unit may also be utilized to perform other functions. For example, persons may carry medical history data on a card or other device. The portable unit may include a suitable card reader or other input device for receiving such data. Such information may be transmitted to the provider of the item who can input such data into a computer system that looks for allergies or possible instructions with the items currently being provided to the user. In this way the provider of the item can reduce the risks of such problems with the items being provided. Additionally, the portable unit may include the capability for delivering data to supplement medical data on a card or other item bearing medical information about the user. For example the portable unit may be programmed to update the data stored on a user's medical history card. The user may update the data through a writer device on the portable unit by engaging the user's medical history card therewith. Of course these approaches are exemplary, and in other embodiments other approaches may be used.

It should be understood that the devices and systems shown and the methods of operation described are exemplary. Embodiments of the present invention may include other types of apparatus and methods.

Thus the apparatus and method of the present invention achieve the above stated objectives, eliminate difficulties encountered in the use of prior devices and systems, solve problems and attain at least some of the desirable results described herein.

In the foregoing description certain terms have been used for brevity, clarity and understanding, however no unnecessary limitations are to be implied therefrom because such terms are for descriptive purposes and are intended to be broadly construed. Moreover, the descriptions and illustrations given herein are by way of examples and the invention is not limited to the details shown or described.

Any feature of the invention that is described in the following claims as a means for performing a function shall be construed as encompassing any means known to those skilled in the art to be capable of performing the recited function and shall not be deemed limited to the means disclosed in the foregoing description or mere equivalents thereof.

Having described the features, discoveries and principles of the invention, the manner in which it is constructed and operated, and the advantages and useful results attained; the new and useful structures, devices, elements, arrangements, parts, combinations, systems, equipment, operations, methods and relationships are set forth in the appended claims.

We claim:

1. Apparatus comprising:
   a body adapted for movement in a pneumatic tube between a customer station and a service provider station, wherein the body includes in supporting connection therewith a card reader, a processor, a memory and an output device, wherein the body is adapted to read card data from a card through operation of the card reader and to store the card data in the memory when the body is at the customer station, and to output signals corresponding to the card data in the memory through the output device when the body is at the service provider station.

2. The apparatus according to claim 1 wherein the body further has in supporting connection therewith a plurality of keys, and wherein the body is adapted to receive at least one key input through the plurality of keys at the customer station, and to store data corresponding to the at least one key input in the memory and to output signals corresponding to the at least one key input through the output device when the body is at the service provider station.

3. The apparatus according to claim 2 wherein the body further has in supporting connection therewith a pair of disposed seal rings adapted for slidable generally fluid tight engagement with an interior wall of the pneumatic tube.

4. The apparatus according to claim 3 wherein the body is removable from the pneumatic tube at both the customer station and at the service provider station.

5. The apparatus according to claim 4 and further comprising an item carrier separable from the body and movable in the tube when the body is removed from the tube between the customer station and the service provider station.

6. The apparatus according to claim 1 wherein the output device comprises a radiation emitting device.

7. The apparatus according to claim 6 wherein the output device comprises at least one LED.

8. The apparatus according to claim 6 wherein the output device is operative to output RF signals.

9. The apparatus according to claim 1 wherein the output device comprises an electrical connector.

10. The apparatus according to claim 1 wherein the output device comprises a display.

11. The apparatus according to claim 1 wherein the processor is operative to cause the card data to be erased from the memory after the signals have been output from the output device.

12. The apparatus according to claim 2 wherein the processor is operative to cause the card data and the data corresponding to the at least one key input to be erased from the memory after the signals corresponding thereto have been output from the output device.

13. The apparatus according to claim 1 and further comprising a reading device adapted to read outputs from the output device at the service provider station.

14. The apparatus according to claim 13 wherein the reading device is in operative connection with a point of sale terminal.

15. The apparatus according to claim 13 wherein the reading device is in operative connection with a cash register.

16. The apparatus according to claim 13 wherein the card data corresponds to an account of the user, and wherein the signals output by the output device correspond to the user's account.

17. The apparatus according to claim 16 and further comprising a charge device at the service provider station, wherein the charge device is in operative connection with a reading device operative to receive signals output by the output device, and wherein the charge device is operative to cause a charge to be assessed to the user's account responsive to receipt of the signals.

18. The apparatus according to claim 17 wherein the charge device includes at least one amount input device operative to input an amount, and wherein the charge device is operative to cause a charge in the amount to be assessed against the account.

19. The apparatus according to claim 18 and further comprising a pharmacy adjacent the service provider station.

20. The apparatus according to claim 19 and further comprising a drive-through lane adjacent to the customer station.

21. The apparatus according to claim 20 and further comprising at least one item in the pharmacy, wherein the at least one item costs the amount, and wherein the at least one item is delivered from the service provider station to the customer station through the pneumatic tube.

22. The apparatus according to claim 17 wherein the body further comprises a reading device and further comprising a further output device in operative connection with the charge device, and wherein the processor is operative to cause the card data to be erased from the memory responsive to at least one further output from the further output device.

23. The apparatus according to claim 22 wherein the further output is produced responsive to the charge device operating to charge the account the amount.

24. The apparatus according to claim 1 and further comprising a carrier, wherein the carrier includes an interior area, and wherein the carrier is movable in the tube between the customer station and the service provider station, and wherein the body is removably positionable within the interior area, wherein the body is positioned in the interior area when the carrier is moved from the customer station to the service provider station.

25. The apparatus according to claim 21 and further comprising a carrier, wherein the carrier includes an interior area, and wherein the carrier is movable in the tube between the customer station and the service provider station, and wherein the body is removably positionable within the interior area, wherein the body is positioned in the interior area when the carrier is moved from the customer station to the service provider station.

26. The apparatus according to claim 25 wherein the at least one item is delivered from the service provider station to the customer station in the interior area of the carrier when the body is not positioned in the interior area.

27. The apparatus according to claim 1 and further comprising a carrier movable in the pneumatic tube, wherein the carrier is not removable from the interior of the pneumatic tube by persons at either the customer station or the service provider station, and wherein the body is integral with the carrier.

28. The apparatus according to claim 1 and further comprising a carrier movable in the pneumatic tube, and wherein the body is integral with the carrier, and wherein the carrier includes an interior area, and wherein the interior area is bounded by a movable cover, and wherein the card reader is in supporting connection with the movable cover.

29. The apparatus according to claim 4 and further comprising:
- a wall adjacent the service provider station, and a further customer station adjacent the service provider station and separated from the service provider station by the wall, and further comprising a wall opening through the wall, and wherein the body is adapted for movement between the service provider station and the further customer station through the wall opening.

30. The apparatus according to claim 29 and further comprising a movable drawer positioned in the wall opening, wherein the body is adapted to be moved through the wall opening in the movable drawer.

31. The apparatus according to claim 1 wherein the body includes a biometric reader, and wherein the memory stores data input through the biometric reader.

32. The apparatus according to claim 21 and wherein the memory is operative to hold data corresponding to instructions concerning the item, and wherein the instructions are output from the body through the output device.

33. The apparatus according to claim 19 wherein the memory is adapted to store medical history data.

34. Apparatus comprising:
- a body adapted for movement in either a pneumatic tube or a movable drawer between a customer station and a service provider station, wherein the body includes a reader adapted for reading indicia corresponding to an account, a processor, a memory and an output device, and wherein at the customer station the body is adapted to read account data through operation of the reading device and to store the account data in the memory, and to output signals corresponding to the account data in the memory through the output device when the body is at the service provider station.

* * * * *